United States Patent
Spry

(10) Patent No.: US 7,257,730 B2
(45) Date of Patent: Aug. 14, 2007

(54) METHOD AND APPARATUS FOR SUPPORTING LEGACY MODE FAIL-OVER DRIVER WITH ISCSI NETWORK ENTITY INCLUDING MULTIPLE REDUNDANT CONTROLLERS

(75) Inventor: Andrew J. Spry, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 587 days.

(21) Appl. No.: 10/741,756

(22) Filed: Dec. 19, 2003

(65) Prior Publication Data

US 2005/0138466 A1 Jun. 23, 2005

(51) Int. Cl.
*G06F 11/00* (2006.01)

(52) U.S. Cl. .................................. 714/4; 714/5; 714/6
(58) Field of Classification Search ...................... None
See application file for complete search history.

(56) References Cited

U.S. PATENT DOCUMENTS

| | | | | |
|---|---|---|---|---|
| 6,009,535 A * | 12/1999 | Halligan et al. | ............... | 714/5 |
| 6,732,289 B1 * | 5/2004 | Talagala et al. | ............... | 714/6 |
| 6,769,071 B1 * | 7/2004 | Cheng et al. | .................. | 714/4 |
| 7,055,056 B2 * | 5/2006 | Bessire | ........................... | 714/6 |
| 2003/0177174 A1 | 9/2003 | Allen et al. | | |
| 2003/0229689 A1 | 12/2003 | Raghavan et al. | | |
| 2005/0223279 A1* | 10/2005 | Malpani et al. | ............... | 714/17 |

OTHER PUBLICATIONS

"iSCSI Naming and Discovery," IPS Internet Draft. Aug. 2001. retrieved from "www.ietf.org".*

(Continued)

*Primary Examiner*—Robert Beausoliel
*Assistant Examiner*—Philip Guyton
(74) *Attorney, Agent, or Firm*—Suiter Swantz PC LLO

(57) ABSTRACT

The invention is directed to a method and apparatus for supporting legacy mode fail-over drivers with an iSCSI network entity including multiple redundant controllers. In an exemplary aspect of the present invention, to support legacy mode fail-over drivers with an iSCSI network entity including multiple redundant controllers, the following configuration constraints may be placed on the iSCSI network entity and its iSCSI configuration: (1) the network device need have two or more redundant controllers; (2) the portals on each controller may or may not be formed into portal groups; (3) the portal groups may not span controllers (i.e., the target portal groups are limited in scope to a single controller); (4) the same iSCSI target name need be exported by all redundant controllers (i.e., the targets span all controllers of the iSCSI network entity, making the LUNs available to all controllers); (5) the target portal group numbers on the redundant controllers need have unique target portal group tags (i.e., all target portal group tags are unique across all portal groups in the iSCSI network entity. However, the target portal group tags do not need to be unique for different iSCSI targets); and (6) all targets are available from at least one target portal group on each controller. In addition, the initiator may use a single ISID for all sessions, use a different ISID for a different session, or the like. The present configuration constraints may enable the normal behavior of the legacy mode SCSI driver to locate and use redundant SCSI paths to the SCSI devices on the iSCSI target.

19 Claims, 2 Drawing Sheets

OTHER PUBLICATIONS iSCSI Technical White Paper; www.ietf.org.

iSCSI Review; http://www.digit-life.com/articles2/iscsi/; Nov. 17, 2003.

iSCSI for Storage Networking; www.ietf.org.

iSCSI Building Blocks for IP Storage Networking; SNIA IP Storage Forum.

iSCSI Protocol Concepts and Implementation; Cisco Systems.

Rob Elliot, Nov. 2, 2002, T10/02-419r0 SAM-3 SPC-3 SAS FCP-3 SRP-2 Device Identifiers and VPD data, pp. 1-2.

* cited by examiner

METHOD AND APPARATUS FOR SUPPORTING LEGACY MODE FAIL-OVER DRIVER WITH ISCSI NETWORK ENTITY INCLUDING MULTIPLE REDUNDANT CONTROLLERS

CROSS-REFERENCE TO RELATED DOCUMENTS

The present application herein incorporates the following United States patent applications by reference in their entirety:

| Attorney Docket Number | Express Mail Label Number | Filing Date |
| --- | --- | --- |
| LSI 03-1819 | EV 303 409 747 US | Dec. 19, 2003 |
| LSI 03-1821 | EV 380 206 525 US | Dec. 19, 2003 |

FIELD OF THE INVENTION

This invention relates generally to data storage systems, and particularly to a method and apparatus for supporting legacy mode fail-over drivers with an iSCSI network entity including multiple redundant controllers.

BACKGROUND OF THE INVENTION

Internet Small Computer System Interface (iSCSI) is an SCSI transport protocol for mapping of block-orientated storage data over TCP/IP (Transmission Control Protocol/Internet Protocol) networks. iSCSI builds on two widely used technologies—SCSI commands for storage and IP protocols for networking. By carrying SCSI commands over IP networks, iSCSI is used to facilitate data transfers over intranets and to manage storage over long distances. The iSCSI protocol enables universal access to storage devices and storage area networks (SANs). These networks may be dedicated networks or may be shared with traditional Ethernet applications.

A conventional iSCSI network entity often includes a single controller. When the entire controller fails or when all physical links to the single controller are lost, these types of errors may be catastrophic to the iSCSI layer running on the single controller and may not be handled by any iSCSI error recovery mechanisms. There are currently no iSCSI products on the market with multiple controller capabilities in their network entities. However, when these types of products become available, a method and apparatus may be needed to integrate these types of products with existing or legacy mode SCSI fail-over drivers.

A mechanism for supporting legacy SCSI fail-over drivers is to write the iSCSI initiator driver to support the legacy SCSI driver. However, this mechanism may require the initiator driver to be aware of the target network device structure. It may also be required to open sessions to multiple iSCSI targets on the network entity to create the redundant paths to the controller needed by the legacy SCSI fail-over driver.

There may exist other fail-over mechanisms which may totally eliminate the need to support the legacy SCSI fail-over drivers. However, these mechanisms may require active monitoring of the network by either a target or initiator driver. These mechanisms may also require active monitoring of the operational state of controllers in a multiple controller network entity to detect controller failures. When a failure of any type is detected by a controller, the targets and storage resources on the failed or inaccessible controller may need to be moved to a controller that may still be accessed by an initiator. In this case, the sessions previously established between the initiator and the target may need to be dropped using some mechanism such as informing an iSNS server of the loss of the target and re-established. Re-establishing the session may require a new discovery sequence by the initiator and the establishment of new security associations. Although these mechanisms may be completely implemented by the iSCSI target network entity using existing iSCSI protocol features and active monitoring, the mechanisms may be inefficient compared to fail-over implemented by a legacy SCSI fail-over driver. The time to detect the failure and re-establish the SCSI I_T nexus may run into multiple seconds, possibly even multiple 10's of seconds if the initiator and target are using secure sessions.

Thus, it would be desirable to provide a method for supporting legacy mode fail-over drivers with an iSCSI network entity including multiple redundant controllers, by which the initiator may not need any knowledge of the redundant controller organization of the target network entity.

SUMMARY OF THE INVENTION

Accordingly, the present invention is directed to a method and apparatus for supporting legacy mode fail-over drivers with an iSCSI network entity including multiple redundant controllers. In an exemplary aspect of the present invention, a method for supporting legacy mode fail-over drivers with an iSCSI network entity including multiple redundant controllers may include the following steps. First, an iSCSI network entity including a plurality of controllers is provided. Then, iSCSI sessions are opened between an initiator and the plurality of controllers to establish a primary iSCSI path and an alternate SCSI path to a logical unit on the iSCSI network entity. When the logical unit is unavailable on the primary iSCSI path, a fail-over is initiated by a legacy SCSI fail-over driver on the initiator. Next, ownership of the logical unit is transferred to one of the plurality of controllers on the alternate SCSI path, and the logical unit is made available via the alternate SCSI path.

In an additional exemplary aspect of the present invention, to support legacy mode fail-over drivers with an iSCSI network entity including multiple redundant controllers, the following configuration constraints may be placed on the iSCSI network entity and its iSCSI configuration: (1) the network device need have two or more redundant controllers; (2) the portals on each controller may or may not be formed into portal groups; (3) the portal groups may not span controllers (i.e., the target portal groups are limited in scope to a single controller); (4) the same iSCSI target name need be exported by all redundant controllers (i.e., the targets span all controllers of the iSCSI network entity, making the LUNs available to all controllers); (5) the target portal group numbers on the redundant controllers need have unique target portal group tags (i.e., all target portal group tags are unique across all portal groups in the iSCSI network entity. However, the target portal group tags do not need to be unique for different iSCSI targets); and (6) all targets are available from at least one target portal group on each controller. In addition, the initiator may use a single ISID for all sessions, use a different ISID for a different session, or the like. The present configuration constraints placed on the iSCSI network entity and its iSCSI configuration may enable the normal behavior of the legacy mode SCSI driver to locate and use redundant SCSI paths to the SCSI devices on the iSCSI target.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention provides a method by which legacy SCSI drivers with fail-over support for network storage devices with multiple controller cards can be used without modification over the new iSCSI transport layer for SCSI devices. The present invention may allow existing (or legacy mode) SCSI fail-over drivers such as the LSI Logic RDAC (Redundant Disk Array Controller), Microsoft MPIO (Multipath I/O) driver, and the like to be used without modification with an iSCSI network entity which includes multiple redundant controllers. The present invention may enable SCSI fail-over drivers to establish redundant paths to a storage device. These drivers may initiate fail-over after a primary path to the storage device becomes inoperative by sending I/O or a logical unit migration command to the storage device on an alternate path to the logical unit. The SCSI fail-over drivers may operate at a layer above the iSCSI layer and may handle error situations where an entire controller has failed or where all physical links to a single controller have been lost. These types of errors may be catastrophic to the iSCSI layer running on a single controller and may not be handled by any iSCSI error recovery mechanisms.

The iSCSI protocol provides a number of mechanisms to support movement of iSCSI targets between network entities. These mechanisms may be used to add support for targets spanning multiple network entities and target movement between network entities. However, these mechanisms are not required in a single network entity including controllers with a shared configuration space.

Figure 1:
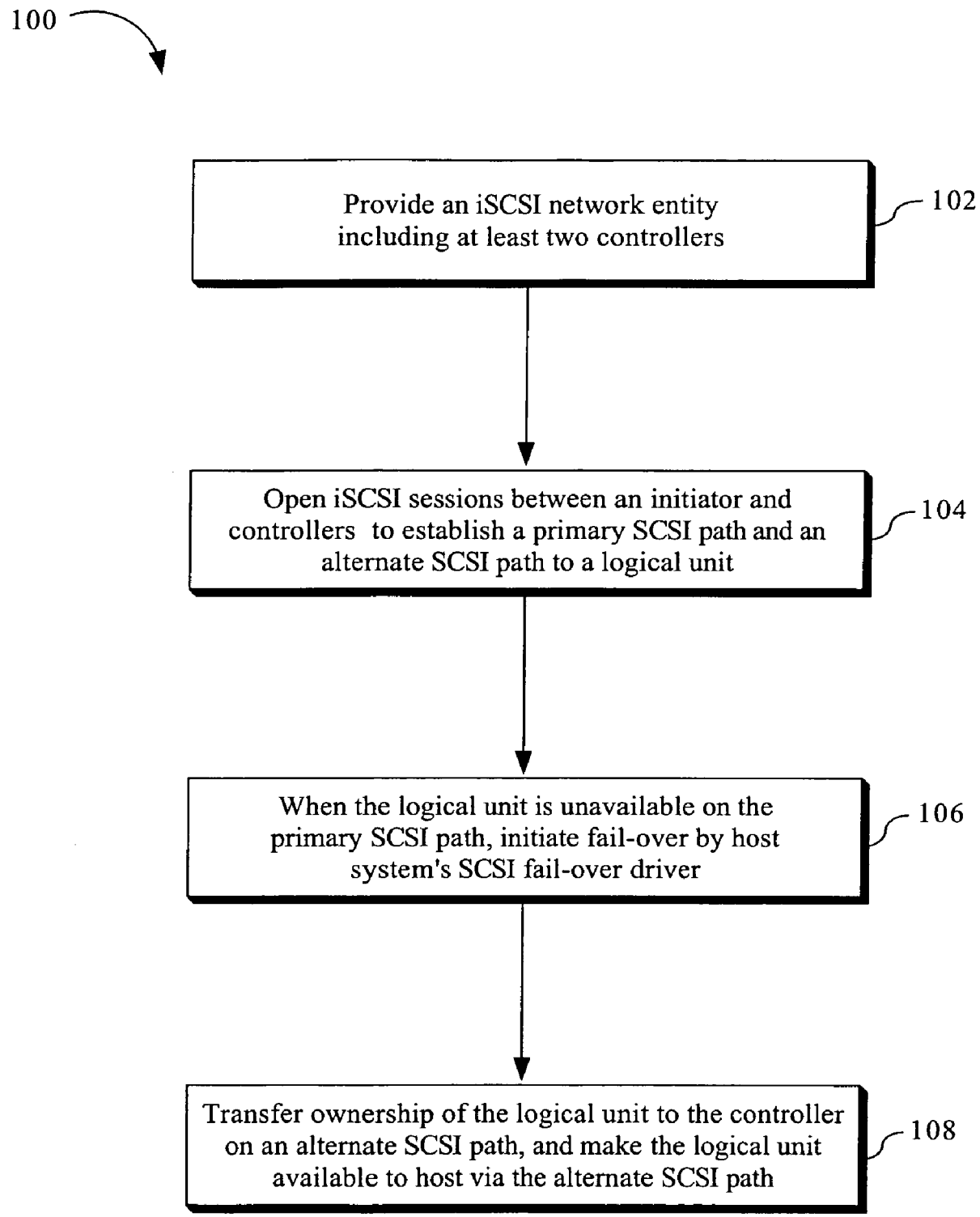
FIG. 1 is a flow chart illustrating an exemplary method for supporting legacy mode fail-over drivers with an iSCSI network entity including multiple redundant controllers in accordance with an exemplary embodiment of the present invention.

Referring now to FIG. 1, an exemplary method or process 100 for supporting legacy mode fail-over drivers with an iSCSI network entity including multiple redundant controllers in accordance with an exemplary embodiment of the present invention is shown. An iSCSI network entity including two or more controllers is provided 102. Then, iSCSI sessions are opened between an initiator and the controllers in the iSCSI network entity to establish a primary SCSI path and an alternate SCSI path to a logical unit on the iSCSI network entity 104. The iSCSI target on the network entity may be accessed from portal groups on the controllers in the network entity. The portals of each controller may be formed into separate portal groups so each session is limited to a single controller. During login, the initiator may log in to all controllers via separate sessions using a single initiator session ID (ISID). The initiator may preferably login using an ISID for one or more sessions and using a different ISID for some other sessions. This way, the present invention may place no configuration requirements on the initiator. The iSCSI session may be uniquely identified by the initiator name, initiator session ID, target name, and target portal group tag. Since the initiator name, initiator session ID, and target name are the same for all sessions, the sessions may be distinguished by the unique target portal group tags on each controller. Each logical unit on the network entity is exported to the initiator via the sessions. The session opened on the controller that owns a logical unit is the primary SCSI path to the logical unit. The session opened to another controller is the alternate SCSI path to the logical unit.

Next, when a logical unit is unavailable on the primary SCSI path, a fail-over may be initiated by the host system's legacy SCSI fail-over driver 106. To provide fail-over, the SCSI driver need see multiple paths to each logical unit on the network entity. In the event of a network, controller, or host interface failure that makes a logical unit unavailable on its primary path, the host system's SCSI fail-over driver may initiate a fail-over. The SCSI fail-over drivers may operate at a layer above the iSCSI layer and may handle error situations where an entire controller has failed or where all physical links to a single controller have been lost. The fail-over may be initiated by sending a logical unit migration command or an I/O to the logical unit via one of the pre-established alternate paths.

On receipt of the I/O or logical unit migration command from the host, the controller on the alternate SCSI path may transfer ownership of the logical unit to itself and make that logical unit available to the host via the alternate SCSI path 108.

It is understood that the method 100 shown in FIG. 1 is isolated to the iSCSI target network entity and may work with a single physical port on the initiator. However, such a configuration may not be able to recover from a failure of the single initiator port.

Figure 2:
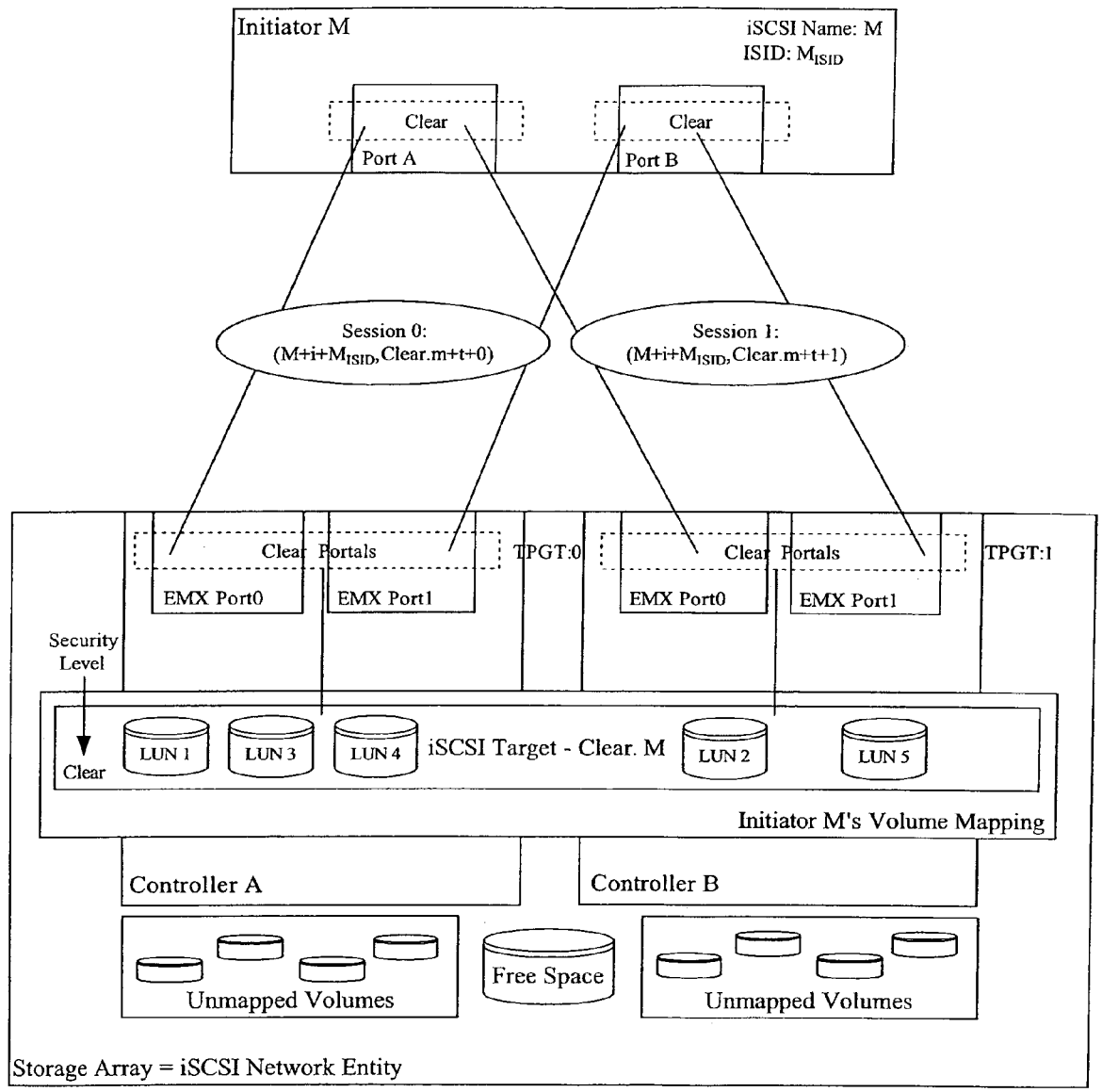
FIG. 2 shows an exemplary iSCSI target configuration that supports controller fail-over in a dual controller network entity in accordance with an exemplary embodiment of the present invention.

FIG. 2 shows an exemplary iSCSI target configuration that supports controller fail-over in a dual controller network entity in accordance with an exemplary embodiment of the present invention. The method 100 shown in FIG. 1 may be implemented in the dual controller network entity shown in FIG. 2. As shown in FIG. 2, the iSCSI target may be accessed from portal groups on both Controllers A and B in the network entity. The portals of each controller are formed into separate portal groups so sessions are limited to a single controller. For example, Session 0 is limited to Controller A, and Session 1 is limited to Controller B. During login, initiator M may log in to both Controllers A and B via separate sessions (Session 0 and Session 1) using the same initiator session ID (ISID). Preferably, initiator M may login using an ISID for one or more sessions and using a different ISID for some other sessions. This way, the present invention may place no configuration requirements on the initiator. The iSCSI session is uniquely identified by the initiator name, initiator session ID, target name, and target portal group tag. Since the initiator name, initiator session ID, and target name are the same for both sessions, the sessions are distinguished by the unique target portal group tags on each controller. For example, Session 0 has a unique target portal group tag (TPGT) 0, and Session 1 has a unique TPGT 1. Each logical unit on the network entity is exported to the host via both sessions. The session opened on the controller that owns a logical unit is the primary SCSI path to the logical unit. The session opened to the other controller is the alternate SCSI path to the logical unit. For example, the primary path to LUN (logical unit number) 1 is through Session 0 and the alternate path is through Session 1.

In the event of a network, controller, or host interface failure that makes a logical unit (e.g., LUN 1) unavailable on its primary path, the host system's legacy SCSI fail-over driver may initiate a fail-over. The fail-over may be initiated by sending a logical unit migration command or an I/O to the logical unit (e.g., LUN 1) via the alternate path. The controller (e.g., Controller B) on the storage array on receipt of the I/O or logical unit migration command from the host may transfer ownership of the logical unit (e.g., LUN 1) to itself and make that logical unit (e.g., LUN 1) available to the host via the SCSI alternate path. It is worth noting that the method is isolated to the iSCSI target network entity and may work with a single physical port (either Port A or Port B) on the initiator M. However, such a configuration may not recover from a failure of the single initiator port.

In a preferred embodiment, to support legacy mode fail-over drivers with an iSCSI network entity including multiple redundant controllers, the following configuration constraints may be placed on the iSCSI network entity and its iSCSI configuration: (1) the network device need have two or more redundant controllers; (2) the portals on each controller may or may not be formed into portal groups; (3) the portal groups may not span controllers (i.e., the target portal groups are limited in scope to a single controller); (4) the same iSCSI target name need be exported by all redundant controllers (i.e., the targets span all controllers of the iSCSI network entity, making the LUNs available to each controller); (5) the target portal group numbers on the redundant controllers need have unique target portal group tags (i.e., all target portal group tags are unique across all portal groups in the iSCSI network entity. However, the target portal group tags do not need to be unique for different iSCSI targets); and (6) all targets are available from at least one target portal group on each controller. In addition, the initiator may use a single ISID for all sessions, use a different ISID for a different session, or the like. However, a well behaved iSCSI initiator driver that follows the ISID Rule in the iSCSI specification will most likely use the same ISID for all sessions opened on multiple portal groups of a single iSCSI target. The present configuration constraints placed on the iSCSI network entity and its iSCSI configuration may enable the normal behavior of the legacy mode SCSI driver to locate and use redundant SCSI paths to the SCSI devices on the iSCSI target.

The present invention may have the following advantages. First, existing SCSI fail-over drivers may be used without modification to handle error scenarios in the network, initiator interface, or target which the iSCSI error recovery techniques cannot handle. Additionally, since an alternate path to the logical unit already exists, transfer of I/O to the alternate path is nearly instantaneous. Moreover, there may be no need to wait for the target to be advertised at an alternate location by a discovery mechanism. Furthermore, there may be no increase in fail-over time when using a security policy for accessing the target. Moreover, the initiator does not need any knowledge of the redundant controller organization of the target network entity.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of software package. Such a software package may be a computer program product which employs a storage medium including stored computer code which is used to program a computer to perform the disclosed function and process of the present invention. The storage medium may include, but is not limited to, any type of conventional floppy disks, optical disks, CD-ROMS, magneto-optical disks, ROMs, RAMs, EPROMs, EEPROMs, magnetic or optical cards, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for supporting legacy mode fail-over drivers with an iSCSI network entity including multiple controllers, comprising steps of:
    (a) providing an iSCSI network entity including a plurality of controllers;
    (b) opening sessions between an initiator and said plurality of controllers to establish a primary iSCSI path and an alternate SCSI path to a logical unit on said iSCSI network entity;
    (c) when said logical unit is unavailable on said primary iSCSI path, initiating a fail-over by a legacy SCSI fail-over driver on said initiator; and
    (d) transferring ownership of said logical unit to one of said plurality of controllers on said alternate SCSI path and making said logical unit available via said alternate SCSI path.

2. The method of claim 1, wherein each of said sessions is identified by a name of said initiator, an initiator session ID, a target name, and a target portal group tag.

3. The method of claim 1, wherein said step (b) comprising:
    limiting a single session of said sessions to a single controller of said plurality of controllers.

4. The method of claim 1, wherein said step (b) comprising: exporting all logical units on said iSCSI network entity to said initiator via said sessions.

5. The method of claim 1, wherein said step (c) comprising: sending one of a logical unit migration command and an I/O to said logical unit via said alternate SCSI path.

6. The method of claim 1, wherein said legacy SCSI fail-over driver operates at a layer above iSCSI layer.

7. An apparatus for supporting legacy mode fail-over drivers with an iSCSI network entity including multiple controllers, comprising:
(a) means for providing an iSCSI network entity including a plurality of controllers;
(b) means for opening sessions between an initiator and said plurality of controllers to establish a primary iSCSI path and an alternate SCSI path to a logical unit on said iSCSI network entity;
(c) when said logical unit is unavailable on said primary iSCSI path, means for initiating a fail-over by a legacy SCSI fail-over driver on said initiator; and
(d) means for transferring ownership of said logical unit to one of said plurality of controllers on said alternate SCSI path and means for making said logical unit available via said alternate SCSI path.

8. The apparatus of claim 7, wherein each of said sessions is identified by a name of said initiator, an initiator session ID, a target name, and a target portal group tag.

9. The apparatus of claim 7, wherein said means for opening (b) comprising:
means for limiting a single session of said sessions to a single controller of said plurality of controllers.

10. The apparatus of claim 7, wherein said means for opening (b) comprising:
means for exporting all logical units on said iSCSI network entity to said initiator via said sessions.

11. The apparatus of claim 7, wherein said means for initiating (c) comprising:
means for sending one of a logical unit migration command and an I/O to said logical unit via said alternate SCSI path.

12. The apparatus of claim 7, wherein said legacy SCSI fail-over driver operates at a layer above iSCSI layer.

13. A computer-readable medium having computer-executable instructions for performing a method for supporting legacy mode fail-over drivers with an iSCSI network entity including multiple controllers, said method comprising steps of:
(a) providing an iSCSI network entity including a plurality of controllers;
(b) opening sessions between an initiator and said plurality of controllers to establish a primary iSCSI path and an alternate SCSI path to a logical unit on said iSCSI network entity;
(c) when said logical unit is unavailable on said primary iSCSI path, initiating a fail-over by a legacy SCSI fail-over driver on said initiator; and
(d) transferring ownership of said logical unit to one of said plurality of controllers on said alternate SCSI path and making said logical unit available via said alternate SCSI path.

14. The computer-readable medium of claim 13, wherein each of said sessions is identified by a name of said initiator, an initiator session ID, a target name, and a target portal group tag.

15. The computer-readable medium of claim 13, wherein said step (b) comprising:
limiting a single session of said sessions to a single controller of said plurality of controllers.

16. The computer-readable medium of claim 13, wherein said step (b) comprising: exporting all logical units on said iSCSI network entity to said initiator via said sessions.

17. The computer-readable medium of claim 13, wherein said step (c) comprising:
sending one of a logical unit migration command and an 110 to said logical unit via said alternate SCSI path.

18. The computer-readable medium of claim 13, wherein said legacy SCSI fail-over driver operates at a layer above iSCSI layer.

19. An iSCSI network entity, comprising:
a plurality of controllers including portals, said portals being organized into portal groups, each of said portal groups having a tag unique across said portal groups, and a single portal group of said portal groups being limited to a single controller of said plurality of controllers; and
targets communicatively coupled to said plurality of controllers, said targets spanning said plurality of controllers to enable all logical units on said iSCSI network entity available to each of said plurality of controllers, and said targets being available from at least one of said portal groups on each of said plurality of controllers, wherein said iSCSI network entity enables a legacy SCSI fail-over driver to locate and use redundant SCSI paths on said iSCSI network entity.

* * * * *